(12) United States Patent
Cooklev (10) Patent No.: US 6,574,218 B1
(45) Date of Patent: Jun. 3, 2003

(54) METHOD AND SYSTEM FOR SPATIALLY DISJOINT JOINT SOURCE AND CHANNEL CODING FOR HIGH-QUALITY REAL-TIME MULTIMEDIA STREAMING OVER CONNECTION-LESS NETWORKS VIA CIRCUIT-SWITCHED INTERFACE LINKS

(75) Inventor: Todor Cooklev, Salt Lake City, UT (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/318,182

(22) Filed: May 25, 1999

(51) Int. Cl.$^7$ ................................................ H04L 12/66
(52) U.S. Cl. ....................................... 370/352; 370/401
(58) Field of Search ................................ 370/352, 353, 370/356, 389, 468, 401; 709/247, 246, 229; 714/2, 776, 758

(56) References Cited

U.S. PATENT DOCUMENTS

| | | | | |
|---|---|---|---|---|
| 5,105,442 A | * | 4/1992 | Wei | 375/262 |
| 5,243,344 A | * | 9/1993 | Kouloupoulos et al. | 341/131 |
| 5,243,428 A | * | 9/1993 | Challapali et al. | 358/167 |
| 5,594,797 A | * | 1/1997 | Alanara et al. | 380/28 |
| 5,768,527 A | | 6/1998 | Zhu et al. | |
| 5,889,868 A | * | 3/1999 | Moskowitz et al. | 382/251 |
| 6,012,159 A | * | 1/2000 | Fischer et al. | 714/755 |
| 6,081,907 A | * | 6/2000 | Witty et al. | 714/6 |
| 6,085,252 A | * | 7/2000 | Zhu et al. | 348/474 |
| 6,170,075 B1 | * | 1/2001 | Schuster et al. | 714/776 |
| 6,366,959 B1 | * | 4/2002 | Sidhu et al. | 709/214 |

OTHER PUBLICATIONS

*Simulation of FEC–Based Error Control for Packet Audio on the Internet*, M. Podolsky et al., INFOCOM (Mar. 1998).
*Video Server*, CRC Handbook (1997).
*Spatially Disjoint Source channel Coding: Taking Advantage of the Current Dial–Up Architecture for Video Over the Internet*, G. Schuster et al., Advanced Technologies Research Center, 3COM Carrier Systems Business Unit, 1800 W. Central Rd. Mr. Prospect, IL 60056.
*Low–complexity Video Coding for Receiver–driven Layered Multicast*, S. McCanne et al., Accepted for Publication in IEEE Journal on Selected Areas in Communications.
*Where Mathematics meets the Internet*, *W. Willinger et al., *W. Willinger is with AT&T Labs–Research, Florham Park, NJ 07932–0971, email: walter@research.att.com.
*Reliable Audio for Use over the Internet*, hhtp://www-mice.cs..ucl.ac.uk/mice/ .../inet95_paper/inet95_paper.fm.html.
*Introduction to Packet Telephony*, HHTP://www.eel.ufl.edu/~sanju/thesis.html.

* cited by examiner

Primary Examiner—Ken Vanderpuye
(74) Attorney, Agent, or Firm—Workman, Nydegger & Seeley (57) ABSTRACT

A system and method for providing multimedia data streaming over a mixed network including a packet-switched and circuit-switched network. The multimedia source server performs both source coding to reduce the overall size of the data and channel coding to provide redundancy for packet reconstruction of lost or late packets. The source coding (or compression) and channel coding (protection against packet loss) are designed jointly, but are performed at two different locations to achieve optimum utilization of bandwidth. The channel coding is removed and packet reconstruction or concealment is performed at the edge of the packet-based network prior to passing the multimedia data on to the circuit-switched network. Retransmission is unnecessary in the present invention which is undesirable for real-time data streaming. A bidirectional embodiment is also described.

17 Claims, 9 Drawing Sheets

METHOD AND SYSTEM FOR SPATIALLY DISJOINT JOINT SOURCE AND CHANNEL CODING FOR HIGH-QUALITY REAL-TIME MULTIMEDIA STREAMING OVER CONNECTION-LESS NETWORKS VIA CIRCUIT-SWITCHED INTERFACE LINKS

BACKGROUND OF THE INVENTION

1. The Field of the Invention

This invention relates generally to data transfer over a network or mixed networks. More specifically, this invention relates to acceptable multimedia data streaming over one or more combined networks in the presence of reduced bandwidth and less reliable network paths.

2. Relevant Technology

The public switched telephone network (PSTN) is designed to carry voice traffic as inexpensively as possible. Until about the end of the 1970's, the PSTN was an entirely analog communication system throughout the world. With the advent of digital computers, it became very desirable to provide a means through which computers could exchange digital information. Special signal transforming devices, called modems, were created, allowing digital devices to communicate over analog communication channels.

Since the end of the 1970's, the core of the PSTN in the United States and other industrialized countries has been completely digital. Still, for cost reasons, most users have an analog connection to their telephone company's digital central office. Since the bandwidth of this analog connection, again for cost reasons, is limited to about 3000 Hz, and since the signal-to-noise ratio is slightly over 30 dB, it follows that according to Shannon's theory, the maximum speed at which information can be exchanged is slightly over 56,000 bits/second. This maximum speed is presently achieved. See International Telecommunications Union, Telecommunication Standardization Sector (ITU-T) Recommendation V.90, Geneva, Switzerland (1998). Modems able to communicate at speeds up to 56,000 b/s are widely available in the marketplace with the largest modem vendor being the assignee, 3Com Corporation.

Until the 1990's, almost 99% of the traffic over the PSTN was voice traffic. The fact that the PSTN is poorly suited to carry data traffic was therefore of little concern since only small portion of the PSTN traffic was data. More recently, the Internet is causing an unprecedented data communication revolution. Currently, about 15% of the total PSTN traffic in the United States is data traffic. This figure is rapidly increasing and is expected to increase in the next several years to about 90%. The Internet continues to grow exponentially and the growth rate shows no sign of slowing. Additionally, the vast majority of present users are connected to the Internet using a V.34 (up to 33,600 bits/second) or V.90 (up to 56,000 b/s in the downstream direction) protocol.

Those familiar with communication network architectures appreciate that the PSTN is a circuit-switched network. A circuit-switched network is one in which the communicating entities are interconnected via a circuit or direct line dedicated interface. A circuit-switched network offers low bandwidth, but high reliability. The high reliability is largely due to the direct dedicated coupling of the communicating entities. Modems used in circuit-switched applications can communicate digital information at a low probability of bit error.

In contrast to the dedicated direct interface of a circuit-switched network, other topologies exist such as a packet-switched network. In a packet-switched network, rather than establishing a dedicated direct connection between the communicating entities, data information packets are addressed and delivered into the network. Routing entities within the network then examine the packet addressing associated with the data information packets and route the packets toward their destination. Additionally, while the PSTN was originally optimized to carry voice traffic, packet-switched networks such as the Internet are optimized to carry non real-time data traffic. Packet networks offer high bandwidth, but do not provide the necessary Quality of Service (QoS) for multimedia communications. Such a low QoS is primarily due to the fact that data information is delivered into a connectionless network where packets may be delivered late, out of order or even lost within the system, unlike in a circuit-switched environment where a direct connection is established between the communicating entities. In a packet-switched network bandwidth is measured in bits/second, as is common in computer networks.

A significant impediment to reliable transmission of multimedia over packet networks is packet delay, reordering, or loss. The most significant of these is packet loss, meaning the concept of bit error rate is meaningless in a packet-switched network. Packets may be lost for a variety of reasons, namely:

congestion of routers and gateways, which leads to a packet being discarded;

delays in packet transmission, which may cause a packet to arrive too late at the receiver to be played back in real-time;

heavy loading of the workstations, leading to scheduling difficulties in real-time multitasking operating systems.

To combat the realities of lost packets in a non-real-time system, there exist retransmission protocols such as TCP that facilitate recovery of lost packets. TCP operates by sending a positive acknowledgement only when a packet is received both in an expected sequence and within a designated time-out period. Furthermore, packets are often re-transmitted due to excessive delay, even though they may not be lost. Such unnecessary retransmission not only increases the overhead, but may be counter-productive in an attempt to maximize bandwidth. Multimedia, especially video, requires significant bandwidth. Unnecessary retransmission of packets can easily cause congestion resulting in exacerbated packet loss. It is widely recognized that TCP is not well-suited to real-time multimedia packet transfers especially those real-time "streaming" types of transfers.

Several approaches for multimedia streaming from a server to a client have been attempted. According to one approach, an entire multimedia file is downloaded using the existing protocols (such as TCP) from the server to the client and then, at the client, the file is played back locally. The shortcomings of such an approach are apparent in that only relatively small multimedia files may be downloaded, otherwise the client has to wait for a long time before the start of playback.

In a second approach, multimedia information is streamed immediately to the client without any re-transmission being preformed to recover lost packets. Such an approach eliminates the delay associated in the first approach, however, quality suffers dramatically as a result of packet loss. In general, packet loss can be between 3% and in some extreme cases up to 25%. Any prior success of either of the aforementioned approaches has been shortlived and are not presently commercially viable. Therefore, other approaches continue to be actively investigated.

One alternate approach is described in the "Real Time Video and Audio in the World Wide Web", by Z. Chen, S.-M. Tan, R. H. Campbell and Y. Li, published in the Fourth Int. WWW conference, 1995. That approach recognizes that not all packets have inherent equal value in a multimedia stream, for example, some packets are more important to an individual perceiving the multimedia data stream than others. In the above approach, a receiver detects which packets are lost and only requests re-transmission of the more important packets. In such an approach, the client also maintains control of the bit rate of the streaming based on the packet loss rate and any re-transmission requests. Such an approach is still not very efficient when the packet loss rate is high. It can lead to congestion and unacceptably low quality.

An additional alternative scheme is described in U.S. Pat. No. 5,768,527, assigned to Motorola Inc. of Schaumburg, Ill. While that patent takes into consideration the low bandwidth provided by dial-up modems as a result of the fundamental limitations of the PSTN, its fundamental disadvantage is that the QoS manager is situated at the client and is responsible for the QoS over both the packet network and the low-speed access link. Thus, from the client's point of view, the overall system described in the Motorola patent is low-bandwidth and of low reliability. The result of such an implementation also impacts potential performance.

Yet another approach relates to forward error-correction (FEC), a concept known in the prior art for circuit-switched networks, and more recently for packet networks as well. This is a very promising technique for ensuring high-quality multimedia streaming. It incurs no additional retransmission delay and is, in principle, suitable for real-time operation. Two approaches for FEC are presently known.

Figure 1:
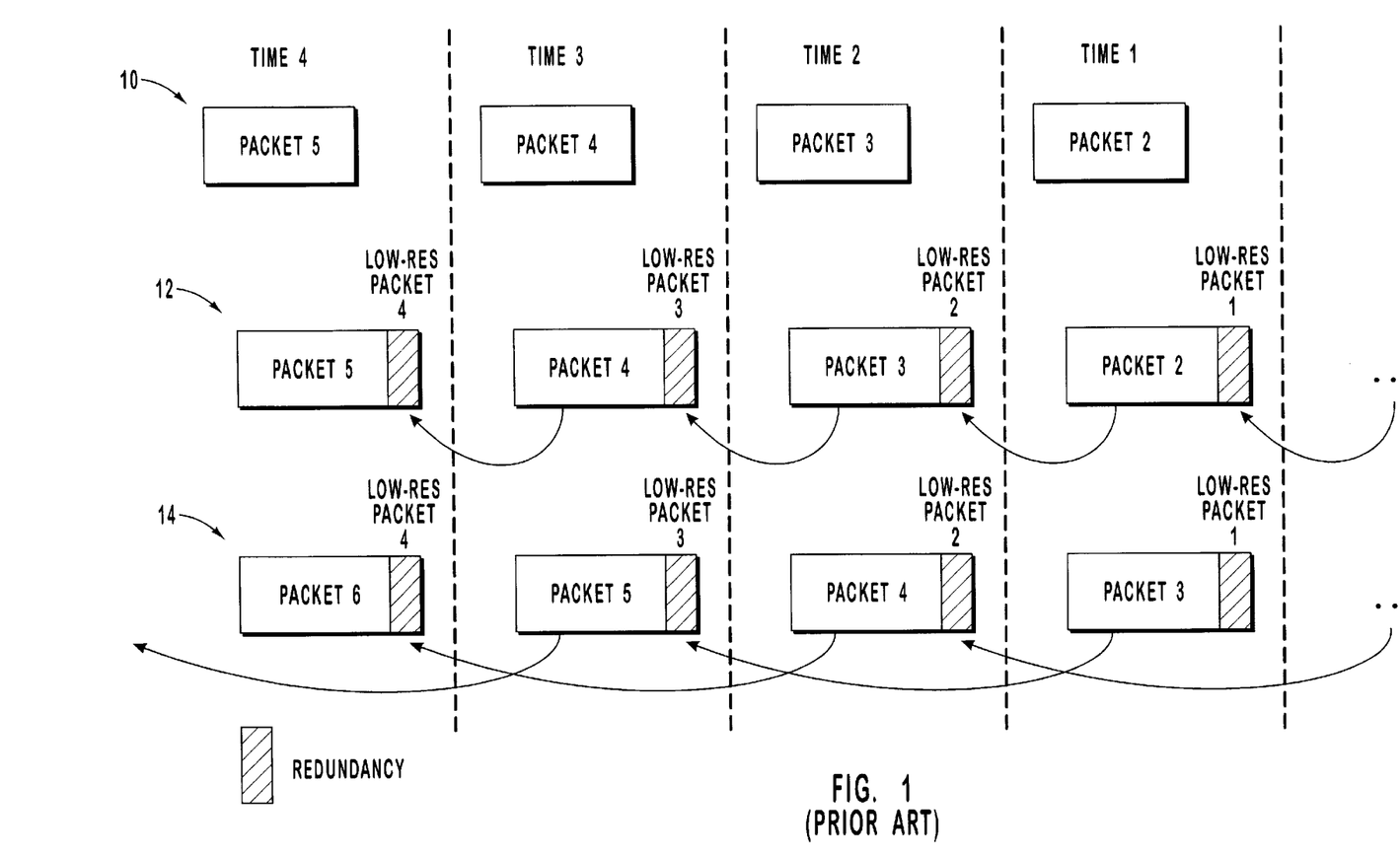
FIG. 1 is a simplified diagram of redundant packetizing of information, in accordance with prior art implementations.

The first approach for FEC is a "joint source and channel coding" approach. In short, it is known from Shannon's theory that source coding (performed at the data originating entity generally for the purpose of reducing the amount of data used to represent the original image/sound etc. and traditionally employs lossy and lossless compression techniques), and channel coding (performed to make the transfer characteristics of the channel more robust) should be preformed separately. However, it is now recognized in the engineering community, that this only holds under theoretical assumptions, which do not hold in many practical cases. In practice, it is possible and sometimes advantageous to design the source coding and the channel coding simultaneously, i.e., incorporating both source coding and channel coding into the data prior to transmission. In such an approach, a lossy, compressed version of the signal is interlaced over the current bit stream. For example, assume each packet k contains not only the multimedia data of frame k, but the compressed encoded data of an earlier frame k-1. If packet k-1 is lost, it will not be recovered exactly, but a lower-quality version of the missing data may be recovered. This idea is illustrated in FIG. 1, where a series of data packets 10 are coded into two separate approaches.

In one approach depicting packets 12, low loss rates are assumed such that an immediately successive packet may be used to recreate a low resolution version of an immediately previous packet. In an approach showing packets 14, higher loss rates are assumed and low resolution versions of earlier packets are appended to packets that are not immediately successive.

Joint source and channel coding may be additionally promising if subband coding is employed. Subband coding involves the partitioning of the signal into specific bands each of which represents different characteristics of a signal such as frequency components. Additionally, various bands may be more essential to the intelligibility of the transferred information. Joint source and channel coding using subband coding does not require re-transmission and is very suitable for real-time multimedia streaming over packet networks. One disadvantage, however, is that such a technique is also not well suited for a low-speed connection, such as a circuit-switched PSTN, with the packet-switched network, such as the Internet. In particular, this technique is not well suited when the probability of a packet loss over the low-speed connection is tiny compared to the probability of a packet loss over the packet network. This, however, is exactly the case in practice. Since redundant information is transmitted over the low-speed, but highly reliable modem link, this technique of including redundant information wastes precious bandwidth over the highly reliable low-speed connection.

A second approach for FEC is to modify techniques such as parity checks, or even Reed-Solomon coding and apply them to packets. Such techniques detect error conditions and recover through reconstruction of the erroneous portions of the packet. In such a case, a lost packet can be recovered exactly at the receiver by performing the corresponding decoding operation. The disadvantage of this technique is that it requires redundant packets to be transmitted over the packet network. In the case of one or few multimedia streams being transmitted, such a technique may achieve the highest quality of all techniques. However, in the case of many multimedia streams transmitting redundant packets, congestion is obtained which results in increased packet loss and lower quality. Furthermore this technique has inherent implementation disadvantages as packet-based decoding may require a huge buffer to ensure real-time operation.

Such an FEC technique is separate from the source coding, i.e., the method falls in the class of separate or disjoint source and channel coding. When the client has a low-bandwidth connection to the packet network that technique can also result in reduced quality, because precious bandwidth is wasted to transmit redundant packets. To remedy this, the concept of spatially disjoint source and channel coding was proposed by G. Schuster, see for example the paper from the IEEE Int. Conf. on Image Processing '98 "Spatially Disjoint Source Channel Coding: Taking Advantage of the Current Dial-up Architecture for Video Over the Internet: by G. Schuster, I. Sidhu, and M. Borella.

Thus, there continues to exist a need for an efficient approach to ensure high-quality multimedia streaming over high-bandwidth packet networks accessed via the highly reliable low-speed modem links.

SUMMARY AND OBJECTS OF THE INVENTION

It is an object of the present invention to provide a system and method for improving multimedia streaming of data from a source server to a client.

It is an additional object of the present invention to provide a method and system for streaming data from a server to a client in an improved reliable manner by employing reliability enhancements such as coding at networks portions that can directly benefit without unduly burdening network portions that are adequately inherently reliable.

The present invention employs spatially disjoint source and channel coding in an attempt to preserve precious bandwidth on the low-speed link for source coding. The present invention also employs channel coding, however, no redundant packets are transmitted. While a lost packet cannot be recovered exactly, a lower-quality version of the lost packet can be recovered if the packet is important. In the present invention, the joint source and channel coding are performed at spatially disjoint places.

The present invention provides and improved approach to streaming multimedia data from a server or source to a client while minimizing the redundant information transferred over the various networks. In the preferred embodiment, a server either having therein or having access to a multimedia data stream performs source coding on the real-time multimedia data stream. The source coding is performed to reduce the overall amount of data that must be transferred to the client, who eventually performs the source decoding. The server prior to transmitting the source coded data also performs channel coding on the source coded data. In the preferred and most widely anticipated network topology, the server is operably coupled to a packet-switched network such as the ubiquitous Internet. It is also know that a packet-switched network is a very lossy network in the sense that data packets may be lost or delayed. Therefore, the present invention also employs channel coding to aid in the reconstruction of any lost packets that are lost in the lesser reliable packet-switched network.

Since the real-time multimedia data is ultimately destined for a client that accesses the packet-switched network via a direct dialup network, the packet-switched network must interface with a gateway that is coupled to the circuit-switched network. A remote access gateway or concentrator (RAC) provides the transition between packet-switched and circuit-switched. The RAC is comprised of a packet processor that evaluates the received packets to determine if they are all present, in order, etc., and attempts to recreate the multimedia data stream. In an effort to recreate the data stream, the packet processor performs channel decoding. Multimedia data is comprised of data that was either entirely present and timely received over the packet network at the RAC, a low quality reconstruction of any missing packets from the redundant information provided in the channel coding process, or alternatively, when redundant information is not present because it too was lost in the packet network or when a lesser important packet was lost and no redundant information was ever channel coded, then an error concealment process is invoked to bridge the unavailable multimedia data.

In the present invention, it is appreciated that for many applications and in particular to high bandwidth requirement applications such as multimedia streaming, the bandwidth as present over the traditionally lower bandwidth but highly reliable circuit-switched link is very precious and should not be squandered through the transmission of unnecessary channel coding redundancy data. The method and system of the present invention utilizes bandwidth much better i.e., no redundant packets are sent over the low-speed modem link. By moving the channel decoding away from the client this technique frees up bits on the low-speed, but highly reliable modem link for the source coding which in turn results in a compressed video of higher quality.

Disjoint source and channel coding is efficient because packet error rates (packet loss) is not an issue for modems. The reliability of a modem connection is described in terms of bit error rates. Modem connections have typically bit error rates of about $10^{-6}$. If a packet contains N bits and if we assume that a single bit error renders the packet useless, then clearly the probability for a packet loss over the modem link is $P=1-(1-10^{-6})^N$. As an example if N=1000, we can determine that P=0.1%. This is at least an order of magnitude smaller than the probability of a packet loss over the Internet.

These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to a specific embodiment thereof which is illustrated in the appended drawings. Understanding that these drawings depict only a typical embodiment of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Real-time multimedia applications can be divided into two types: one-way streaming multimedia and two-way streaming (interactive) multimedia. In one-way streaming multimedia, the information flow is largely one-way from a server to a client, except for control information sent by the client. The end-to-end delay requirements for one-way streaming are less stringent than for two-way streaming, but are more strict than for non-real-time data applications.

One-way Multimedia Streaming

Figure 2:
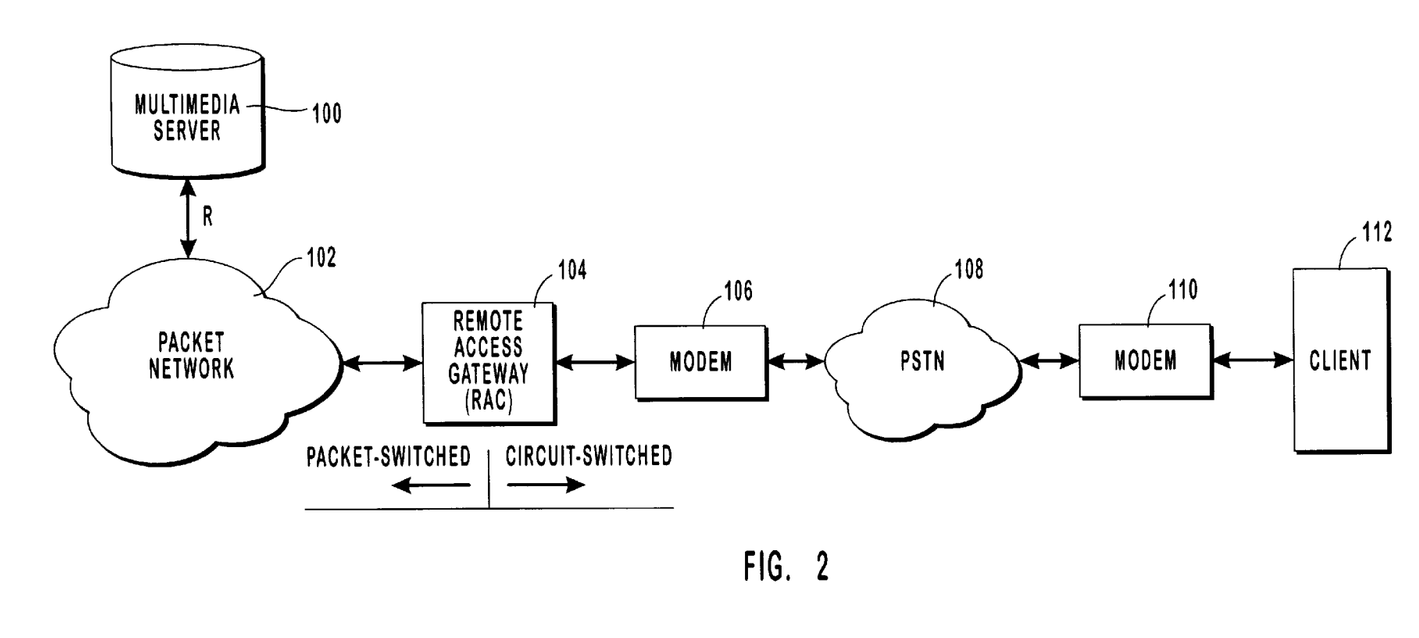
FIG. 2 is a simplified block diagram of a real-time multimedia a streaming architecture, in accordance with a preferred embodiment of the present invention.

FIG. 2 is a block diagram of the coupling between a client and a server in accordance with one aspect of the present invention. Multimedia packets are sent by a server 100 at a rate of R bits/second. A packet network 102 then carries the packets to a remote access gateway 104 to be fed into a low-speed point-to-point access link for delivery to a client 112. Voiceband modems 106 and 110 via a circuit-switched network such as PSTN 108 are used to connect access gateway 104 and client 112. Other forms of transmission devices may be employed such as ISDN modems. Clearly the bandwidth bottleneck lies in the low-speed access link to the client. The present invention provides a novel scheme for real-time streaming of multimedia data available from a remote server to a client.

Figure 3:
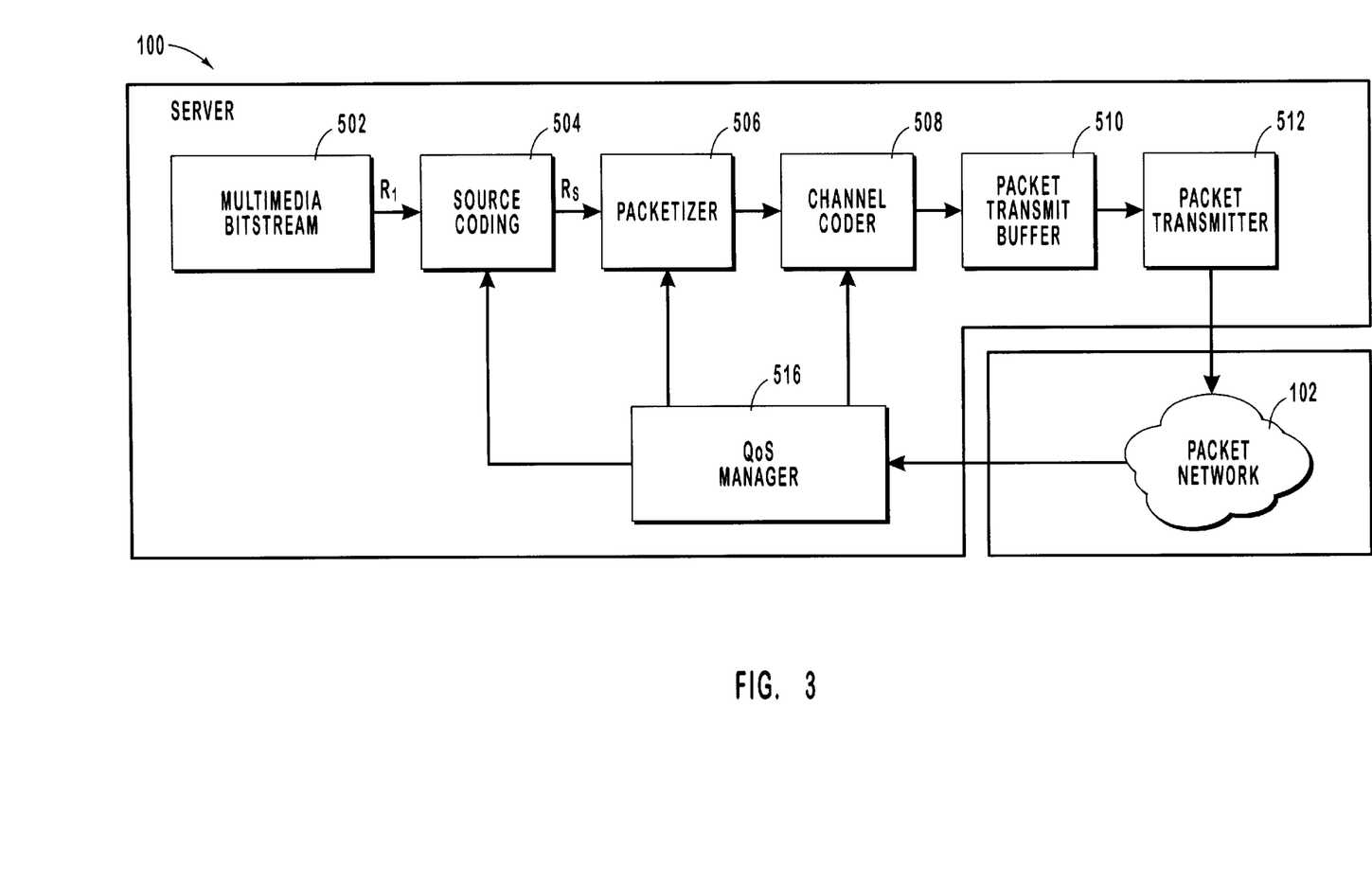
FIG. 3 is a block diagram of a multimedia server for performing coding, in accordance with a preferred embodiment of the present invention.

A multimedia streaming system is typically comprised of a transmitter and a receiver. A more detailed block diagram of the transmitter shown as a server of the multimedia streaming embodiment of the present invention is depicted in FIG. 3 with specific components describing below.

Transmitter

Multimedia information typically consists of two or more media streams such as real-time multimedia data stream 502 (e.g., audio and video). The importance of each media type for the perceived service quality may be different. For example, audio quality is typically more important than video quality. In addition, sophisticated source coding algorithms may further partition information within a given media into different layers of different importance. For example, in MPEG video coding, a so-called I picture is more important than a P picture, which in turn is more important than a B picture (see for example D. LeGall "MPEG: a Video Compression Standard for Multimedia Applications," Communications of the ACM, April 1991).

Source Coding

The function of a source coder 504 is to reduce the raw multimedia bit rate. In the preferred embodiment, source coder 504 is comprised of a plurality of subband source coders, one for every multimedia type. Many subband coders are known and appreciated by those of skill in the art, and provide different performance as well as different complexities. For this example, we define the data at the output of the source coder to exhibit a rate of $R_s$.

The source coding rate $R_s$ is chosen to be equal to the maximum available bit rate B on the modem connection, taking lossless compression (e.g., V.42 compression) into consideration. A QoS manager at the receiving RAC determines this rate and communicates it to the server 100. Since B is allowed to change with time, every change in $B_1$ is communicated to the server 100. Recommendation V.90 actually envisages many bit rates, depending on the line conditions. As the phone line conditions of the PSTN improve, the maximum bit rate at which the client 112 (FIG. 2) can receive data increases and therefore the source streaming rate can be increased. The source coding rate is controlled ultimately by the client 112 (FIG. 2) based on the client's connection rate to the packet network 102 (FIG. 2). This rate can be communicated to the server at any time, and the source coding rate in a preferred embodiment is adaptive.

Packetizer 506

The multimedia data (or file) is transmitted in packets as partitioned by a packetizer 506 with each packet having at least a header and one or more informational fields. Depending on the specific protocol in use, a packet may be of fixed or variable length. The header of a packet contains a field called sequence number. The header of a packet also contains a field describing the number of information fields that it contains and their importance. The use of a packet buffer is unnecessary, because no re-transmission is performed. Since the original multimedia stream can be viewed as consisting of several substreams, packetization is performed in a way that a packet preferably only contains information from one substream, wherein each substream is identified by using a different substream identifier in the packet header.

Channel Coding

Channel coding, performed by a channel coder 508, accommodates the imperfect or packet losing nature of channels. One novel aspect of the present invention is the approach for inclusion of redundant low-resolution information to each packet. In its most fundamental explanation as exhibited in FIG. 4, the redundant information in a low resolution version 614 is appended to a selected packet or packets, shown as being appended to packets 621 and 623 in the eventuality that the original higher resolution packet 622 becomes lost or stale.

Figure 4:
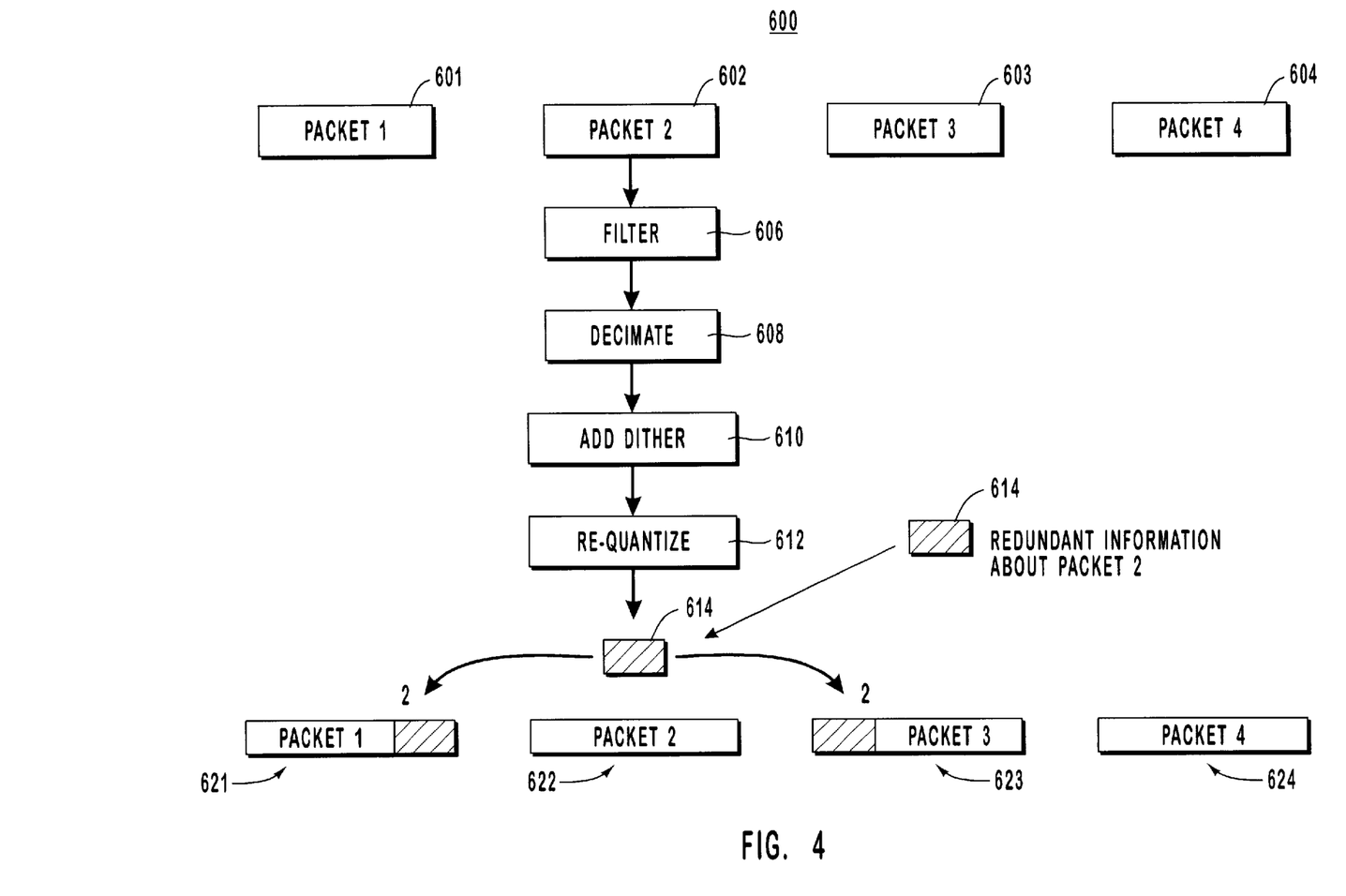
FIG. 4 is a flow diagram depicting the generation of low-resolution redundant information for appending to data packets, in accordance with the channel coding of a preferred embodiment of the present invention.

In the preferred embodiment, the packet 602 undergoing channel coding is first subjected to lowpass filtering 606, downsampling 608 and dithered quantization 610 and 612 to reduce the wordlength. For example, suppose that a certain packet containing audio data is considered important and therefore necessary to be protected. FIG. 4 depicts the operation of channel coder 508. Suppose that this audio data is sampled at 22.05 Khz and is coded using 16 bits, yielding packets 601–604. First, a filtering step 606 is performed by an appropriate filter, then a downsampling or decimation step 608 is performed to reduce the overall sample size by a corresponding amount and, finally, an add dither step 610 adds dither to the samples before the data is requantized in a step 612 to a certain number of bits, less than 16, typically eight. The downsampling ratio (and therefore the filter characteristic) as well as the final wordlength are determined by the QoS manager 516 in the transmitter.

Dithered quantization of audio is known by those of skill in the art (see for example the paper "Subtractive dither for audio files," J. Audio Engineering Society, 1998), but dithered quantization has heretofore not been used for performing forward error-correction. The present application of dithered quantization differs from the above publication in that it proposes the use of subtractive dithering in the compression of audio .wav files, but does not consider packet-based transmission, channel coding and complete systems, such as that described in the present invention. Furthermore, the present invention contemplates the use of a new dither signal with desirable properties.

Therefore, in the preferred embodiment of the present invention, the quality is increased by employing dithered quantization. Without dithering, coarse quantization leads to an error which is signal dependent. This is, noise modulation manifests itself as particularly deleterious distortion. A technical advancement is made in the present invention to eliminate or considerably remove this distortion by employing dithering. Therefore, the resulting error in the proposed system is nearly signal independent, i.e. it is random error. Providing the particular bandwidth suffices, the random error can be kept just below the threshold of the human perception to achieve higher quality for the same redundancy rate. As a result, the present invention facilitates performance as good as that of exact-reconstruction packet-based FEC schemes, such as parity checks or Reed-Salomon coding, without incurring the cost of complex decoding operations and without causing additional congestion on the packet network.

A technical advancement is made, according to the present invention, based in part on a recognition that it is advantageous to reduce, or eliminate, the quantization error which is correlated with the input signal, even at the expense of increasing uncorrelated (random) error. There are two fundamental reasons why this is advantageous: first, the human perception is much more sensitive to correlated errors, than to uncorrelated errors, and second, uncorrelated errors can be further reduced, if desired, by noise-removal techniques. For example in audio signals, correlated error signals can be heard as noise modulation and harmonic distortion. In contrast, the effect of uncorrelated error can be perceived as a benign addition of noise. Furthermore, according to the present invention, the amount of dither in each subband can be individually controlled, so that this uncorrelated error be kept just below a certain threshold. In the case of audio signals, this threshold will be the threshold of human hearing. In the case of video signals, this threshold is the threshold of the human visual system. In this way, the inherent tradeoff between the amount of redundancy introduced and reconstructed signal quality can be optimized, based on the characteristics of the input signal (audio or video, required quality, etc.), and on the network performance.

Packet Transmitter

Returning to FIG. 3, a packet transmitter 512 fetches packets from a packet buffer 510 and transmits them over the packet network. Some of the packets will carry redundant data, which is the low-quality version of a previous or earlier in order packet. If $R_s$ is the bit rate following the source coder 504, then the bit rate at which packets are transmitted over the packet network is R, where $R > R_s$. The QoS manager 516 ensures that the optimal amount of redundancy is added to each packet.

Receiver

In the present implementation, retransmission is not employed. If a packet is lost, then the RAC 104 (FIG. 2) reconstructs or recovers a lower-quality version of the dropped packet or attempts to conceal the fact that a packet was lost and then transmits it to the client. A block diagram of the RAC is presented in FIG. 5. The receiving RAC 104 includes a packet buffer 702, a packet processor 704, and a QoS manager 712. The packet buffer is operably coupled to receive a sequence of incoming packets from the underlying transmission device. The packet buffer 702 accommodates the prospect of packet reordering. The packet processor 704 is operably coupled to the packet buffer 702. The packet processor 704 extracts the sequence number present in the header of every packet and detects, first, whether packets have arrived in order, and, second, the presence of packet loss. The packet processor 704 performs, if necessary, packet re-ordering.

The Missing Packet Reconstruction Block 710

Figure 6:
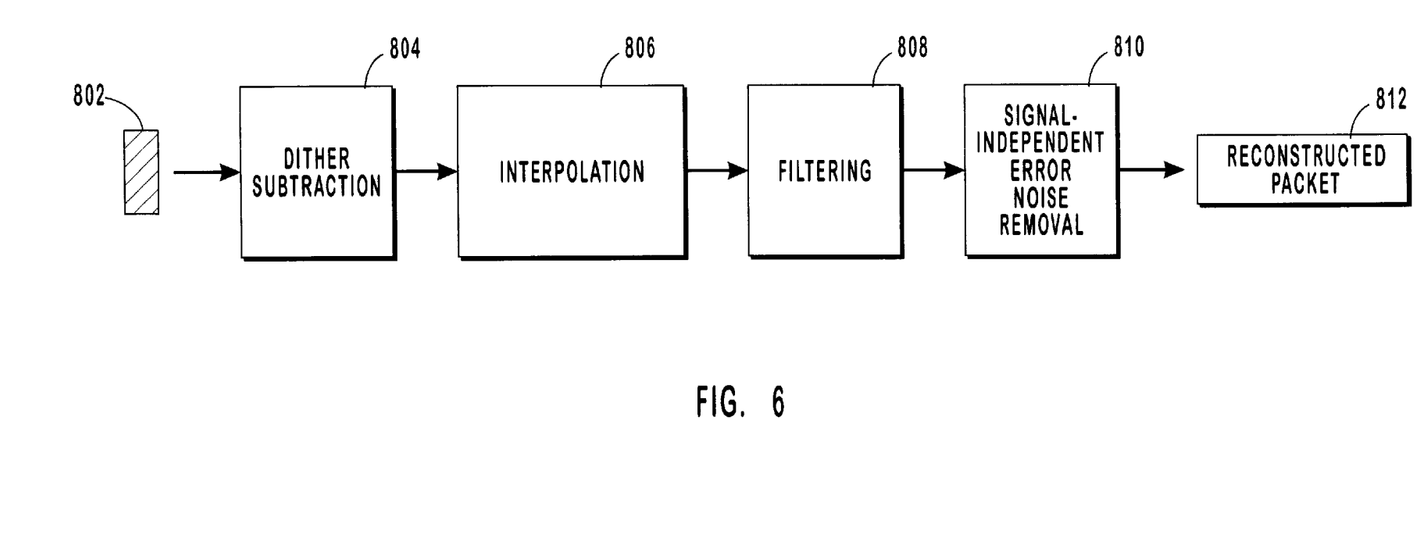
FIG. 6 is a simplified flow diagram for reconstructing a packet, in accordance with a preferred embodiment of the present invention.

Upon detection of a lost packet, the packet processor 704 determines the importance of the lost packet. If the lost packet is "important," the missing packet reconstruction block or process 710 tries to recover a lower-quality version of the lost data from other packets. FIG. 6 depicts the processing of a lower-quality version information of the missing data packet 802 into a reconstructed lower-quality data packet 812. This lower-quality version of the missing data packet 802 would typically be available in an information field of a neighboring packet. In the preferred embodiment, the dithering signals are made available to a dither subtraction process 804 when subtractive dithering is employed. Dithering assists in eliminating the signal-dependent error and reduces the signal-independent (random) error. It is very desirable to keep the random noise floor just below the threshold of the human auditory system (in the case of audio) or the human visual system (in the case of video).

Regarding dithering, the addition of dither to the subband signals prior to quantization provides and improved approach over non-dithered quantization, even if the dithering signals cannot be made available to the receiver/decoder (i.e., non-subtractive dither). This scheme will reduce signal-dependent noise, at the expense of random noise, however, the effects of random noise are much more benign, and it is not as impactful to the signal, as is the signal-dependent noise. Additional processing such as interpolation or inverse decimation processing at process 806, and filtering process at process 808 are also performed for reconstructing a low-quality version of the lost packet. Finally, noise-removal techniques as illustrated in process 810 may be applied at the receiver to ultimately achieve a reconstructed signal with even higher quality.

The Error-concealment Process 706

Returning to FIG. 5, if the lost packet is determined to be "not important" (i.e., not sufficiently important to have appended a low-quality version of the data packet to at least one other packet), or its importance cannot be determined before a certain time-out period, or when a lower-quality version of a lost important packet cannot be recovered in a certain period of time, the packet processor 704 activates the error concealment process 706. The function of the error concealment process 706 is to increase the quality of the multimedia presentation by filling the gaps that are missing. The error concealment process 706 can modify the bitstream stored in a bitstream buffer 708. Those of skill in the art appreciate several error-concealment techniques such as the technique described in Q.-F. Zhu et. al. "Coding and cell loss recovery for DCT-based packet video," IEEE Trans. CAS Video Technology, pp. 248–258, June 1993, incorporated herein by reference.

Bitstream Buffer 708 and QoS Manager 712

Figure 5:
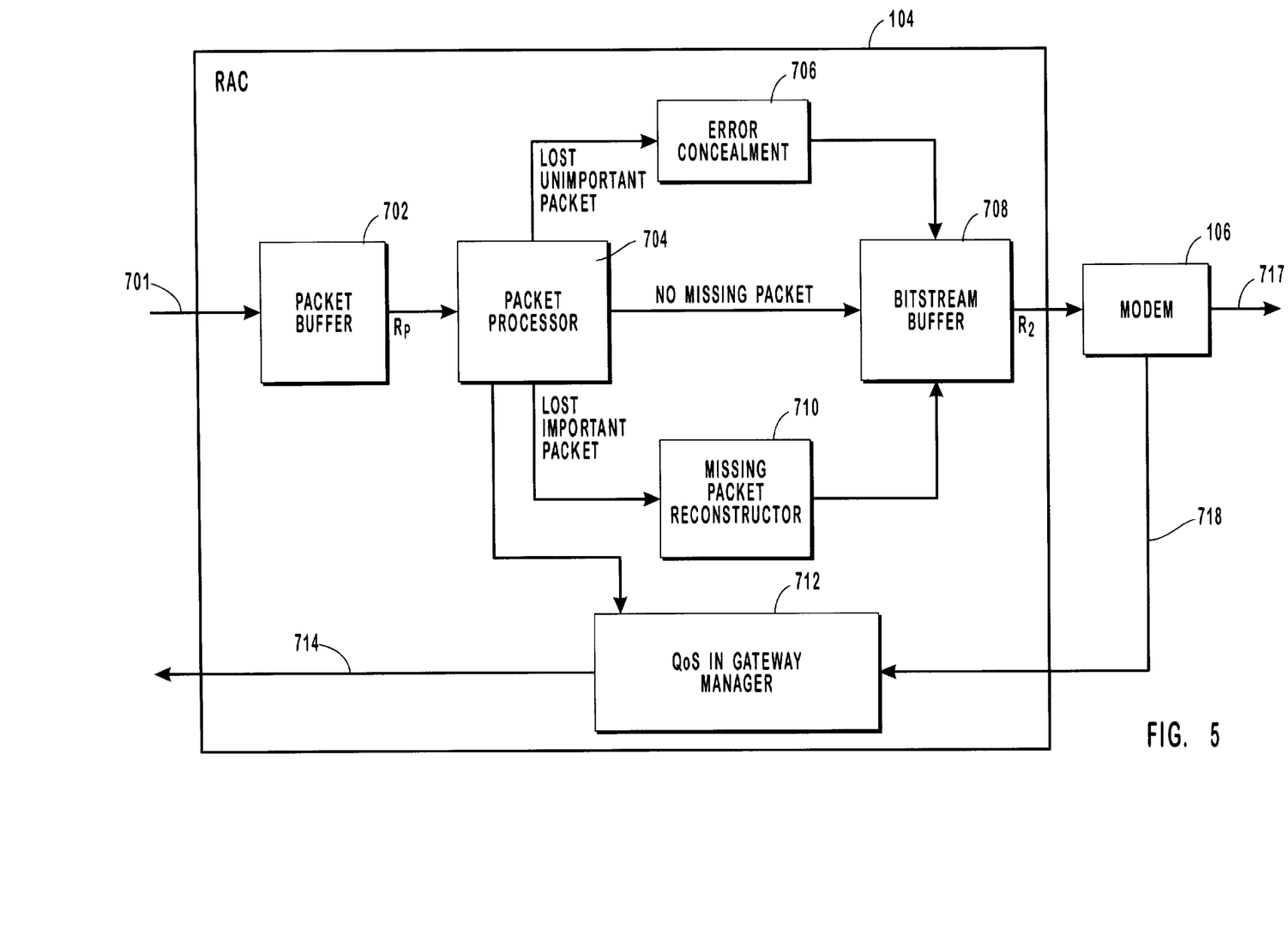
FIG. 5 is a block diagram of a remote access gateway or concentrator between the packet and circuit switched domains, in accordance with a preferred embodiment of the present invention.

The bitstream buffer 708 generates a bit stream from the received or reconstructed packets and transmits the bit stream to the client 112 (FIG. 2) via a low-speed modem link (i.e., via modem 106, PSTN 108 and modem 110, all of FIG. 2). The QoS manager 712 is operably coupled to the packet processor 704 and sends feedback messages to the server 100 (FIG. 2). For example, QoS manager 712 informs the server 100 (FIG. 2) the quantity of redundant information to present in each packet and the corresponding source coding rate. If the speed at which the client 112 (FIG. 2) is connected to the RAC 104 (FIG. 2) changes, the QoS manager 712 communicates the change to the QoS manager 516 of server 100 (FIG. 2). The transmitting modem 106 (FIG. 2) will perform, for example, V.42bis lossless compression and V.42 error-correction encoding on the multimedia data stream. See Recommendation V.42bis, "Data Compression Procedures for Data Circuit Terminating Equipment (DCE) Using Error Correcting Procedures," The International Telegraph and Telephone Consultative Committee, 1990, pp. 1–27.

It is known that V.42 is well-suited for communications over highly-reliable connections, such as modem links. Arrangements based on packet re-transmission or packet-based FEC are poorly suited for communications over modem links. The use of V.42 will guarantee that there will be no bit errors over the modem link. V.42 is based on a re-transmission protocol, the delay of which can be considered negligible, as it will be taken into consideration by the bit stream buffer on the client side.

The Client Device 112

Figure 7:
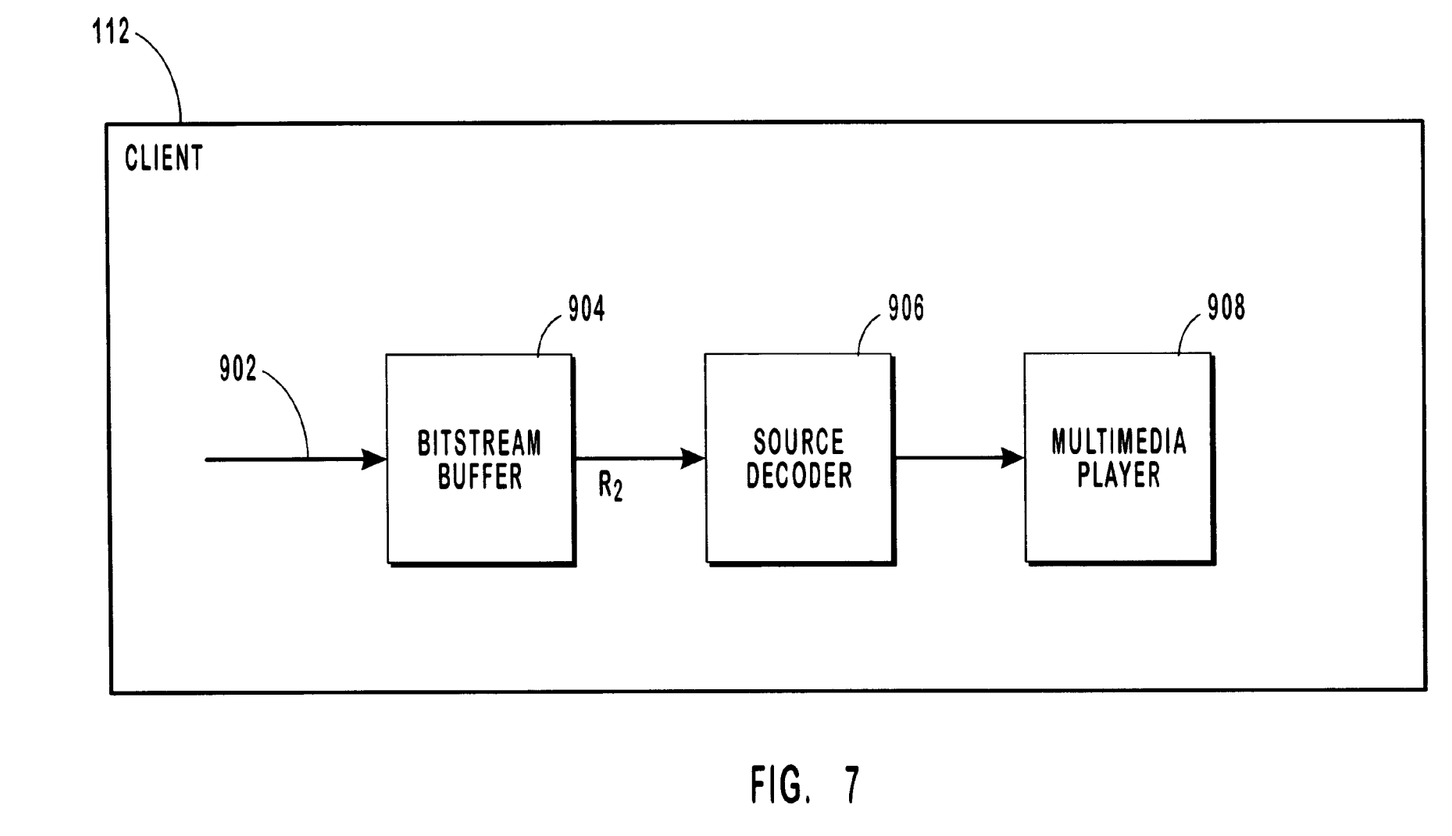
FIG. 7 is a block diagram of a client, in accordance with a preferred embodiment of the present invention.

FIG. 7 depicts the processing as provided by a client 112. The client 112 performs the multimedia bit stream as it receives it in real-time. The client 112 is comprised of the following components: a bitstream buffer 904, source decoder 906 and a multimedia player 908. The bitstream buffer 904 is utilized for buffering the bitstream generated by the packet processor 704 (FIG. 5) at the RAC 104. The source decoder 906 reconstructs the original multimedia data. The multimedia player 908 is operably coupled to the source decoder 906 and is used for presenting the received bitstream.

Bidirectional Embodiment

Figure 8:
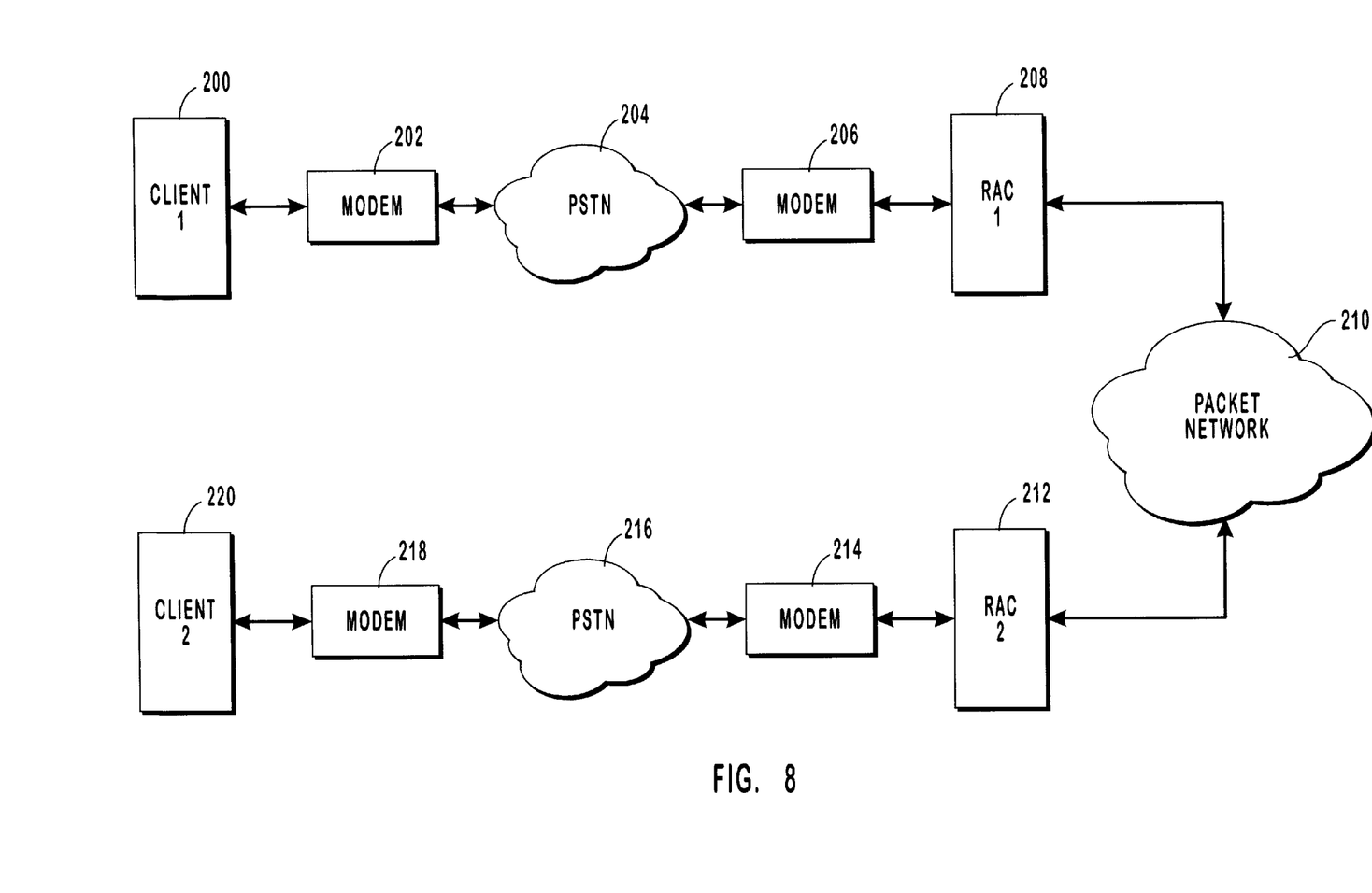
FIG. 8 is a simplified block diagram of a bidirectional real-time multimedia data streaming, in accordance with a preferred embodiment of the present invention.

An additional preferred embodiment pertains to two-way or bidirectional multimedia streaming, a block diagram of which is shown in FIG. 8. Though both clients can transmit and receive, for ease of explanation we can assume that a client_1 200 will be transmitting and a client_2 220 will be receiving. Client_1 200 performs the source coding of the multimedia bitstream. The rate of the compressed multimedia bitstream is determined by the rate of the connection. If the two client devices are connected via V.90 modems, this rate will not be 56,000 b/s, because this rate can be achieved only in the downstream direction. The compressed multimedia data is sent via a modem link (i.e., via modem 202, PSTN 204 and modem 206) to a RAC_1 208.

Figure 9:
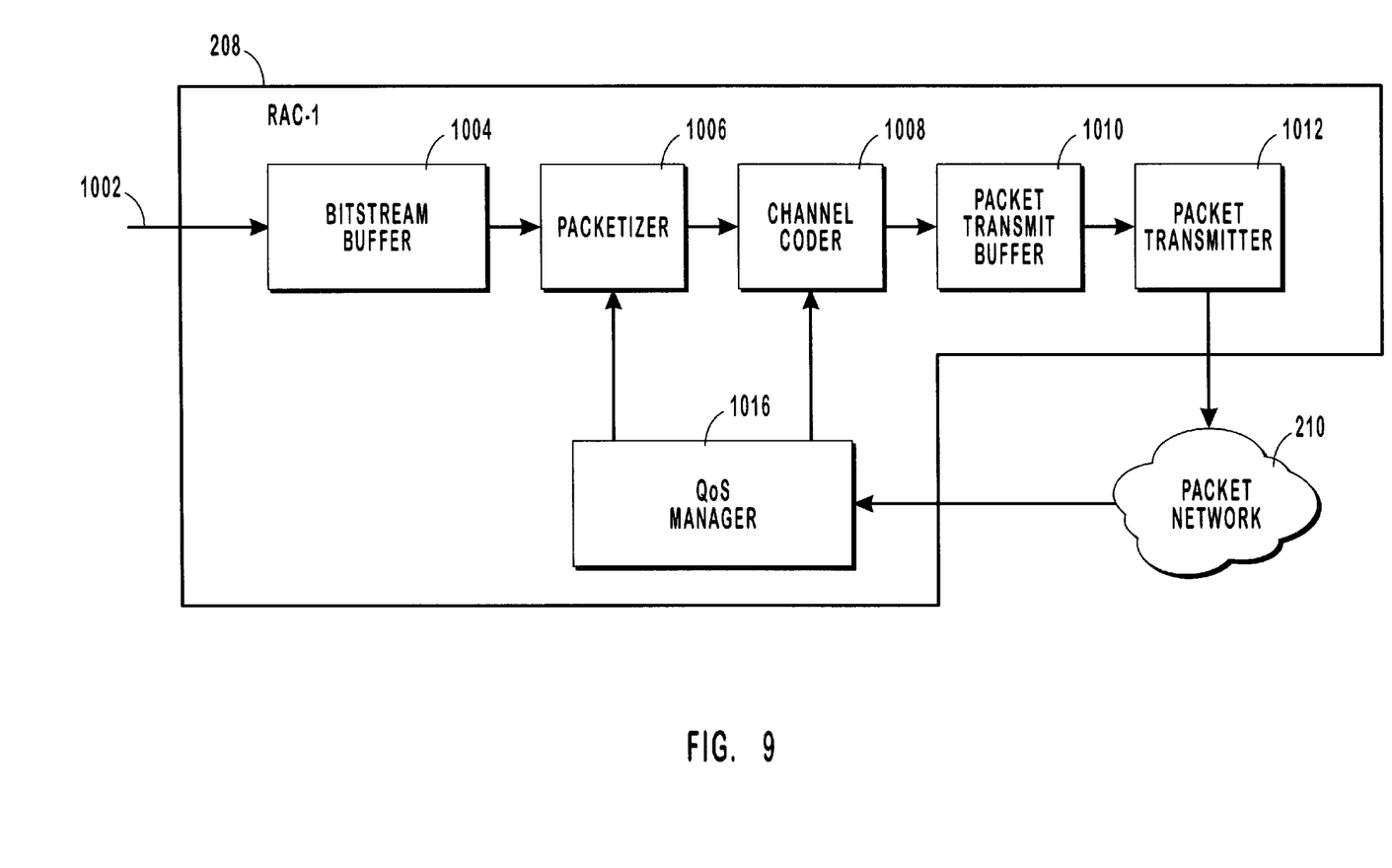
FIG. 9 is a block diagram of a remote access gateway or concentrator in a bidirectional application when the client is transmitting, in accordance with a preferred embodiment of the present invention.

FIG. 9 is a block diagram of RAC_1 208 for a bi-directional embodiment of the present invention. For the present embodiment, the functionality and composition of bit stream buffer 1004, packetizer 1006, channel coder 1008, packet transmit buffer 1010, packet transmitter 1012, and QoS manager 1016 correspond to the components as described above in FIG. 3. The resulting packets are transmitted via the packet network 210 to RAC_2 212 (FIG. 8). The RAC_2 212 (FIG. 8) can be constructed in the same way as shown in FIG. 5. Then, the obtained bit stream is transmitted to client_2 220, which can be constructed in the same way as shown in FIG. 7.

One of the primary differences between the half duplex streaming embodiment and the full duplex or bi-directional embodiment is that the half duplex embodiment pertains to the case when the transmitter has a high-bandwidth connection to the packet network, such as in one-way multimedia streaming. The full duplex or bidirectional embodiment pertains to the case of interactive two-way multimedia communications over packet networks, accessed via modem links.

Thus, in the half duplex embodiment, source and channel coding are performed jointly and in the same place, while the decoding operations are performed at two spatially different locations. In the full duplex or bidirectional embodiment both the coding and the decoding operations are performed at spatially different locations, while they are still designed jointly.

The present invention provides and advancement by incorporating intelligence at the edge of a packet network thereby providing a fundamentally superior approach over previous solutions. Using single error-correction coding and decoding over the entire connection from the server to the client does not make full use of the available bandwidth in the circuit-switched network environment. Thus applying one error-correcting scheme for the packet network and another one for the modem link (such as V.42) is a much better choice, because each scheme is tailored for the reliability of the communication channel over which it is applied.

While as an example we have used a low-speed V.90 connection to the Internet, it is clear that the present invention can be used in other cases as well. For example, it can be used when the user has an ISDN connection to the Internet at speeds of 64,000 b/s, or 128,000 b/s. The higher the speed the higher the source coding rate can be, and this directly translates into higher quality. The present invention can be used without significant modifications when the user has a connection to the Internet at a higher rate, for example G. lite or ADSL. In these cases the rate of the connection can be between 256 Kbps to 6 Mbps. These services may be considerably more expensive than V.90 and it is natural that their users prefer a much higher quality multimedia stream. For example, an MPEG video stream requires 1.5 Mbps, digital high-definition TV (HDTV), for example, requires more than 10 Mbps.

The present invention may be known as joint source and channel coding, because source coding and channel coding are designed jointly: the channel coding scheme assumes layered signal compression, which results in more important and less important packets. However, source coding and channel coding and decoding are not performed at the same location to achieve optimum utilization of bandwidth.

What is claimed and desired to be secured by United States Letters Patent is:

1. A system for transferring a real-time multimedia data stream over a packet-switched network and through a circuit-switched network to a user, the system comprising:

a server having the real-time multimedia data stream available thereto, the server to source code the real-time multimedia data stream into source coded multimedia data and to channel code at least a portion of the source coded multimedia data into source and channel coded multimedia data wherein the server comprises a channel coder to code redundant information describing the at least a portion of the source coded multimedia data into the source and channel coded multimedia data, wherein the channel coder comprises a dither process to add dither to the redundant information during channel coding of the source coded multimedia data;

a remote access gateway operably coupled to the server via the packet-switched network, the remote access gateway to channel decode the source and channel coded multimedia data into reconstructed source coded multimedia data; and a client operably coupled to the remote access gateway via the circuit-switched network to source decode the reconstructed source coded multimedia data into a reconstructed real-time multimedia data stream for perceiving by the user.

2. The system, as recited in claim 1, wherein the server further comprises a packetizer to partition the source coded multimedia data into packets prior to transmitting the source and coded multimedia data into the packet-switched network.

3. The system, as recited in claim 1, wherein the server further comprises a quality of service manager to monitor in conjunction with the remote access gateway the amount of the redundant information required to accommodate channel losses of portions of the source and channel coded multimedia data.

4. The system, as recited in claim 1, wherein the remote access gateway further comprises a packet processor to receive the source and channel coded multimedia data from the server and to channel decode the source and channel coded multimedia data into reconstructed source coded multimedia data.

5. The system, as recited in claim 4, wherein the remote access gateway further comprises:

a missing packet reconstructor process which, upon detection by the packet processor of a missing portion of the source and channel coded multimedia data and when determined to be important, the missing packet reconstructor process reconstructing the missing portion of the source and channel coded multimedia data from redundant information of other portions of the source and channel coded multimedia data; and an error concealment process which, upon detection by the packet processor of the missing portion of the source and channel coded multimedia data and when the missing portion of the source and channel coded multimedia data is determined by the packet processor to be unimportant or when the importance is undeterminable, the error concealment process creating a substitute portion for replacing the missing portion of the source and channel coded multimedia data.

6. The system, as recited in claim 4, wherein the remote access gateway further comprises a quality of service manager to monitor the packet processor in determining the amount of redundant information required in the server performing channel coding to accommodate reconstruction of the portions of the source and channel coded multimedia data lost when delivered through the packet-switched network to the remote access gateway.

7. The system, as recited in claim 4, wherein when the server employs subtractive dither to channel code the source coded multimedia data the remote access gateway further comprises a dither process to subtract dither from the redundant information during channel decoding of the source and channel coded multimedia data.

8. In a real-time multimedia data streaming system, a method for operably coupling between a packet-switched network and a circuit-switched network for transferring a real-time multimedia data stream, that has been source and channel coded into source and channel coded multimedia data, between the packet-switched network and the circuit-switched network, the method comprising:

receiving the source and channel coded multimedia data from the packet-switched network;

evaluating portions of the source and channel coded multimedia data;

detecting a missing portion of the source and channel coded multimedia data;

determining the importance of the missing portion of the source and channel coded multimedia data;

reconstructing the missing portion of the source and channel coded multimedia data from other portions of the source and channel coded multimedia data when the missing portion of the source and channel coded multimedia data is found to be important from the step of determining; and creating a substitute portion for replacing the missing portion of the source and channel coded multimedia data when the missing portion of the source and channel coded multimedia data is determined to be unimportant from the step of determining.

9. The method, as recited in claim 8, further comprising monitoring to determine the amount of redundant information required to accommodate reconstruction of the missing portions of the source and channel coded multimedia data lost when delivered through the packet-switched network.

10. In a real-time multimedia data streaming system, a remote access gateway for operably coupling between a packet-switched network and a circuit-switched network for transferring a real-time multimedia data stream, that has been source and channel coded into source and channel coded multimedia data, between the packet-switched network and the circuit-switched network, the remote access gateway comprising:

a packet processor to receive the source and channel coded multimedia data from the packet-switched network and to evaluate portions of the source and channel coded multimedia data;

a missing packet reconstructor process which, upon detection by the packet processor of a missing portion of the source and channel coded multimedia data and determination of the importance of the missing portion of the source and channel coded multimedia data, and when important, the missing packet reconstructor process for reconstructing the missing portion of the source and channel coded multimedia data from other portions of the source and channel coded multimedia data;

an error concealment process which, upon detection by the packet processor of the missing portion of the source and channel coded multimedia data and when the missing portion of the source and channel coded multimedia data is determined by the packet processor to be unimportant or when the importance is undeterminable, the error concealment process for creating a substitute portion for replacing the missing portion of the source and channel coded multimedia data; and when the source and channel coded multimedia data employs subtractive dither to channel code, a dither process to subtract dither from the redundant information during channel decoding of the source and channel coded multimedia data.

11. In a real-time multimedia data streaming system, a server operably coupled to a packet-switched network wherein the packet-switched network is further operably coupled to a circuit-switched network, the server for transferring a real-time multimedia data stream from the server to a client via a remote access gateway, the server comprising:

a source coder to source code the real-time multimedia data stream into source coded multimedia data; and a channel coder to channel code at least a portion of the source coded multimedia data into source and channel coded multimedia data, the channel coder for determining an importance of each portion of the source coded multimedia data and for each important one of the source coded multimedia data coding redundant information describing the important one of the source coded multimedia data into the source and channel coded multimedia data.

12. The server, as recited in claim 11, wherein the server further comprises a packetizer to partition the source coded multimedia data into packets prior to transmitting the source and channel coded multimedia data into the packet-switched network.

13. The server, as recited in claim 11, wherein the server further comprises a quality of service manager to monitor in conjunction with the remote access gateway the amount of the redundant information required to accommodate channel losses of portions of the source and channel coded multimedia data.

14. In a real-time multimedia data streaming system, a server operably coupled to a packet-switched network wherein the packet-switched network is further operably coupled to a circuit-switched network, the server for transferring a real-time multimedia data stream from the server to a client via a remote access gateway, the server comprising:

a source coder to source code the real-time multimedia data stream into source coded multimedia data; and a channel coder to channel code at least a portion of the source coded multimedia data into source and channel coded multimedia data, the channel coder for determining an importance of each portion of the source coded multimedia data and for each important one of the source coded multimedia data coding redundant information describing the important one of the source coded multimedia data into the source and channel coded multimedia data wherein the channel coder further comprises a dither process to add dither to the redundant information during channel coding of the source coded multimedia data.

15. A method for real-time multimedia data streaming from a server over a packet-switched network to a remote access gateway and through a circuit-switched link to a client, the method comprising the steps of:

source coding at the server a real-time multimedia data stream into source coded multimedia data;

channel coding at least a portion of the source coded multimedia data into source and channel coded multimedia data comprising coding redundant information describing the at least a portion of the source coded multimedia data into the source and channel coded multimedia data wherein coding further comprises adding dither to the redundant information during channel coding of the source coded multimedia data;

channel decoding at the remote access gateway the source and channel coded multimedia data into reconstructed source coded multimedia data; and source decoding at the client the reconstructed source coded multimedia data into a reconstructed real-time multimedia data stream for presentation by the client.

16. The method, as recited in claim 15, further comprising the step of packetizing the source coded multimedia data into packets prior to transmitting the source and coded multimedia data into the packet-switched network.

17. The method, as recited in claim 15, further comprising the steps of:

receiving the source and channel coded multimedia data from the packet-switched network;

evaluating portions of the source and channel coded multimedia data;

upon detection of a missing portion of the source and channel coded multimedia data, determining the importance of the missing portion of the source and channel coded multimedia data, and when important, attempting to reconstruct the missing portion of the source and channel coded multimedia data from other portions of the source and channel coded multimedia data; and upon detection of the missing portion of the source and channel coded multimedia data and when the missing portion of the source and channel coded multimedia data is determined to be unimportant or when the importance is undeterminable, creating a substitute portion for replacing the missing portion of the source and channel coded multimedia data.

* * * * *